United States Patent
Hasegawa et al.

(10) Patent No.: US 8,400,074 B2
(45) Date of Patent: Mar. 19, 2013

(54) ELECTRONIC BALLAST WITH FEEDBACK CURRENT CONTROL FOR PREHEATING OF LAMP FILAMENTS

(75) Inventors: Junichi Hasegawa, Kashiwara (JP); Nobutoshi Matsuzaki, Neyagawa (JP)

(73) Assignee: Panasonic Corporation, Osaka (JP)

(*) Notice: Subject to any disclaimer, the term of this patent is extended or adjusted under 35 U.S.C. 154(b) by 368 days.

(21) Appl. No.: 12/711,752

(22) Filed: Feb. 24, 2010

(65) Prior Publication Data

US 2010/0237793 A1   Sep. 23, 2010

(30) Foreign Application Priority Data

Feb. 24, 2009   (JP) ................. 2009-041505

(51) Int. Cl.
*H05B 41/36* (2006.01)

(52) U.S. Cl. ............ 315/291; 315/209 R; 315/224; 315/307

(58) Field of Classification Search ........... 315/209 R, 315/307, 308, 291, 224
See application file for complete search history.

(56) References Cited

U.S. PATENT DOCUMENTS

| | | | | |
|---|---|---|---|---|
| 6,160,362 A * | 12/2000 | Shone et al. | ................ | 315/308 |
| 6,518,712 B2 * | 2/2003 | Weng | ................ | 315/209 R |
| 6,965,204 B2 | 11/2005 | Langeslag | | |
| 7,161,308 B2 * | 1/2007 | Kanno et al. | ................ | 315/291 |
| 7,944,156 B2 * | 5/2011 | Quazi | ................ | 315/307 |
| 8,093,837 B2 * | 1/2012 | Goriki et al. | ................ | 315/307 |
| 2006/0039168 A1 * | 2/2006 | Mier-Langner et al. | ...... | 362/648 |
| 2007/0138975 A1 * | 6/2007 | Suganuma et al. | ........... | 315/291 |
| 2007/0210723 A1 * | 9/2007 | Kumagai et al. | ......... | 315/209 M |
| 2007/0285032 A1 * | 12/2007 | Fukuda et al. | ............... | 315/307 |

* cited by examiner

*Primary Examiner* — Jacob Y Choi
*Assistant Examiner* — Ephrem Alemu
(74) *Attorney, Agent, or Firm* — Waddey & Patterson, P.C.; Mark J. Patterson; Gary L. Montle (57) ABSTRACT

A discharge lamp ballast is provided for powering a discharge lamp with feedback filament heating control. A startup circuit is coupled between output terminals of a DC-AC power converter together with a discharge lamp. A lamp current detection circuit and a lamp voltage detection circuit detect output signals to the lamp. A control circuit controls the switching elements and generates an operating frequency in accordance with a startup operation to generate a high voltage output from the startup circuit and ignite the discharge lamp, a filament heating operation wherein the operating frequency is controlled so as to set the amplitude of the output current detected by the lamp current detection circuit to a target current amplitude based on the amplitude of the output voltage detected by the lamp voltage detection circuit, and a steady-state operation wherein the operating frequency is decreased to maintain a stable light output from the discharge lamp.

20 Claims, 10 Drawing Sheets

ELECTRONIC BALLAST WITH FEEDBACK CURRENT CONTROL FOR PREHEATING OF LAMP FILAMENTS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-041505, filed Feb. 24, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an electronic ballast for powering a discharge lamp and an illumination fixture incorporating the same.

Figure 12:
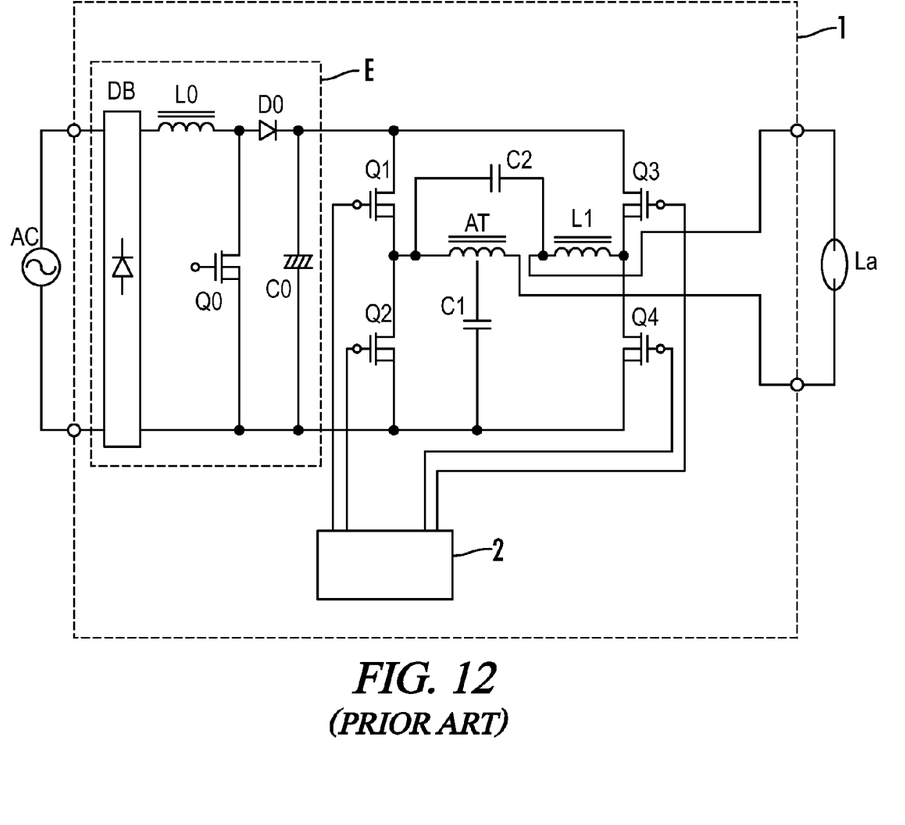
FIG. 12 is a circuit diagram showing a lamp ballast as previously known in the art.

Referring to FIG. 12, an example is shown of a discharge lamp ballast for powering a hot cathode type discharge lamp such as a high-pressure discharge lamp, also called an HID (High-Intensity Discharge lamp). The discharge lamp ballast 1 includes a DC power source E for converting an AC power input, as for example supplied from an AC power source AC such as a commercial power source, into direct-current (DC) power.

The DC power source E includes a diode bridge DB with an output terminal on the low voltage side connected to ground and that performs full wave rectification of the AC power input, a diode D0 having an anode coupled to an output terminal on the high voltage side of the diode bridge DB via an inductor L0 and a cathode coupled to ground via an output capacitor C0, a switching element Q0 having a first end coupled to a node between the inductor L0 and the diode D0 and a second end coupled to ground, and a drive circuit (not shown in the drawing) for controlling the switching element Q0 to turn on or off to maintain a constant output voltage of the DC power source E, that is, a voltage across the output capacitor C0. Specifically, the DC power source E is configured by connecting a commonly-known boost converter (a step-up chopper circuit) between the output terminals of the diode bridge DB.

In addition, the discharge lamp ballast 1 as previously known in the art includes a full bridge circuit including four switching elements Q1 to Q4 as a power converter for converting DC power input from the DC power source E into AC power. Field effect transistors (FETs or MOSFETS) can be used as the switching elements Q1 to Q4. One of the output terminals of the above-mentioned full bridge circuit, that is, a node between the switching elements Q1 and Q2, is coupled to one end of a discharge lamp La (that is, one of the filaments) via an inductive element which in the example shown includes a primary and a secondary winding of an auto transformer AT. Additionally, a tap on an auto-transformer AT between the primary and secondary windings is coupled to ground via a first capacitor C1. The other output terminal of the full bridge circuit, that is, a node between the switching elements Q3 and Q4, is coupled to the other end (that is, the other filament) of the discharge lamp La via the inductor L1. A second capacitor C2 is coupled on a first side between the switching elements Q1 and Q2 and on a second side between the inductor L1 and the discharge lamp La. The auto-transformer AT, the first capacitor C1, the second capacitor C2, and the inductor L1 collectively define a resonant circuit coupled between the output terminals of the power converter (hereinafter referred to as "a load circuit") together with the discharge lamp La.

The discharge lamp ballast 1 further includes a control circuit 2 for driving each of the power converter switching elements Q1 to Q4 respectively. The control circuit 2 turns the switching elements Q1 to Q4 on and off so that a diagonally-positioned pair among the switching elements Q1 to Q4 (i.e., Q1 and Q4 or Q2 and Q3) can be turned on at the same time and a pair connected with each other in series among the switching elements Q1 to Q4 (i.e., Q1 and Q2 or Q3 and Q4) can be alternately turned on or off. In this manner, the DC power input from the DC power source E is converted into AC power, and an AC power frequency with polarity reversal is generated by the above-mentioned on-off driving (hereinafter referred to as "an operational frequency").

During a startup procedure of a discharge lamp La by the discharge lamp ballast 1, the control circuit 2 carries out three operations. First, a startup operation is conducted to ignite the discharge lamp La by relatively increasing an output voltage from the power converter. Second, a filament heating operation is conducted wherein an output power frequency from the power converter is relatively increased to heat each filament of the discharge lamp La. Third, a normal (i.e., steady-state) operation is conducted to output an AC signal from the power converter as needed to maintain a stable light output from the discharge lamp La.

Figure 13:
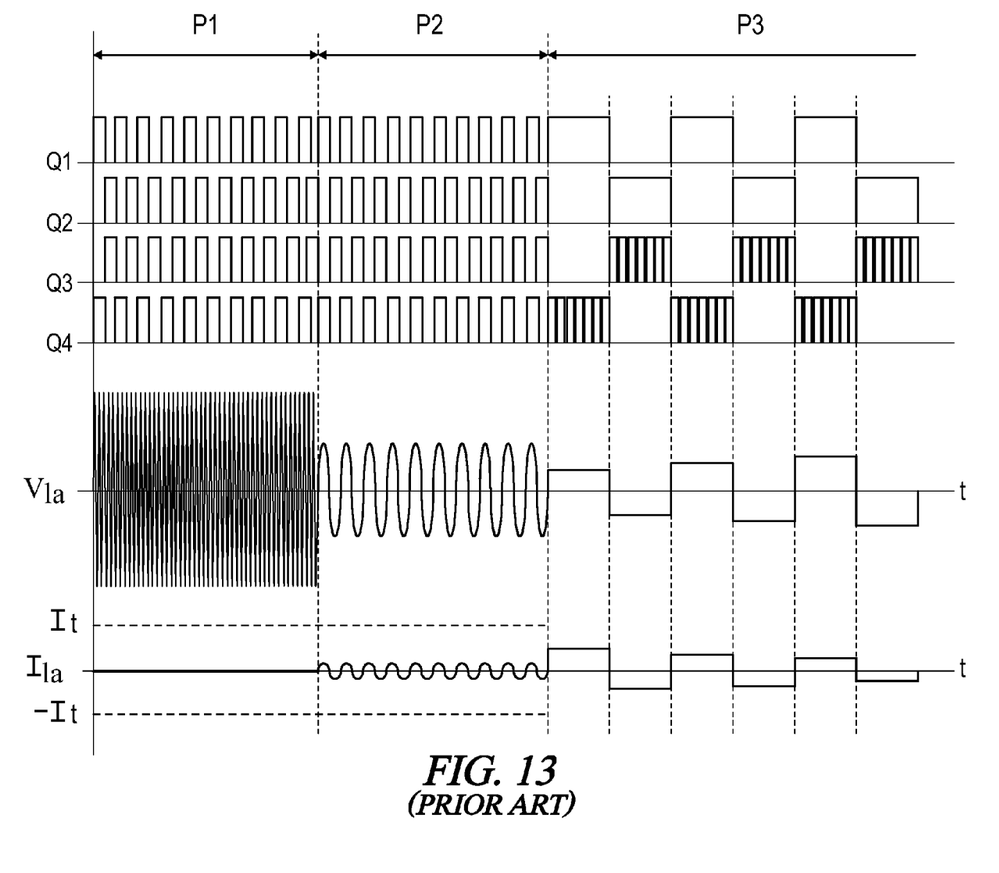
FIG. 13 is a graphical diagram showing switch drive signal inputs, a lamp voltage and a lamp current with respect to time in the ballast of FIG. 12.

With reference to FIG. 13, an example of operation of the control circuit 2 as previously known in the art may be explained in detail. The first four waveforms in FIG. 13 show input drive signals to the respective switching elements Q1 to Q4, that is, voltages applied between the gate and the source of each respective switching element, with respect to time. The respective switching elements Q1 to Q4 are turned on in periods when the above-mentioned drive signals are in an H level and turned off in periods when the above-mentioned drive signals are in an L level.

When the power source is turned on, the control circuit 2 first conducts a startup operation to initiate discharge in the discharge lamp La. During the startup period P1 when the startup operation is carried out, the control circuit 2 sufficiently raises a voltage output Vla to the discharge lamp La (hereinafter referred to as "a lamp voltage") to initiate discharge in the discharge lamp La by setting the operational frequency approximately to a resonant frequency of the load circuit consistent with a condition where the discharge lamp La is producing no light output or otherwise turned off (herein referred to as a "pre-ignition resonant frequency") which may be, for example, a few dozen kHz to a few hundreds kHz. That is, the operational frequency in such a condition is set to approximately a resonant frequency (or 1/n multiplied by the resonant frequency, where n is a whole number) of a resonant circuit which includes a primary winding of the auto transformer AT coupled between the switching elements Q1 and Q2 and the first capacitor C1. When the lamp voltage Vla is raised to a voltage required for ignition, that is the start of glow discharge, the discharge lamp La ignites and an output current begins flowing through the discharge lamp La. The auto transformer AT and the first capacitor C1 may further be referred to as a starting circuit.

After the above-mentioned startup period P1, the control circuit 2 shifts to a filament heating period P2 during which a filament heating operation is carried out. In the example of FIG. 13, the operational frequency during the filament heating period P2 is maintained at the same frequency as the operational frequency during the start-up period P1.

After the filament heating operation is carried out for what may be a predetermined time, the control circuit 2 shifts to a normal period P3 during which steady-state operation is carried out. As the temperature in the discharge lamp La rises, the lamp voltage V gradually rises for a few minutes immediately after the shift to the normal period P3 and then stabilizes. The operational frequency f during the steady-state operation is, for example, a few dozen Hz to a few hundreds Hz. In the example of FIG. 13, the control circuit 2 in the normal period P3 controls output power to the discharge lamp La with a PWM control to turn on or off one of the switching elements Q3 and Q4, whereas switching element Q3 is controlled when switching element Q2 is on and switching element Q4 is controlled when switching element Q1 is on, at a duty ratio depending on a power to be output to the discharge lamp La and at a sufficiently higher frequency than the operational frequency f.

In the example of FIG. 13, because the same operational frequency is employed in the startup period P1 and in the filament heating period P2, an amplitude of the lamp current 11a is smaller than an amplitude. It required to sufficiently heat a filament of the discharge lamp La.

Figure 14:
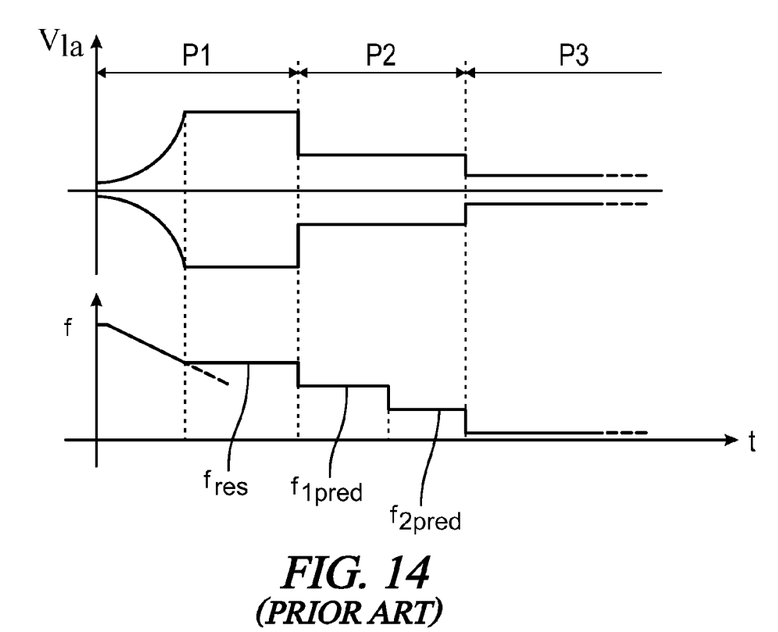
FIG. 14 is a graphical diagram showing changes in a lamp voltage and an operation frequency with respect to time in the ballast of FIG. 12.
Figure 15:
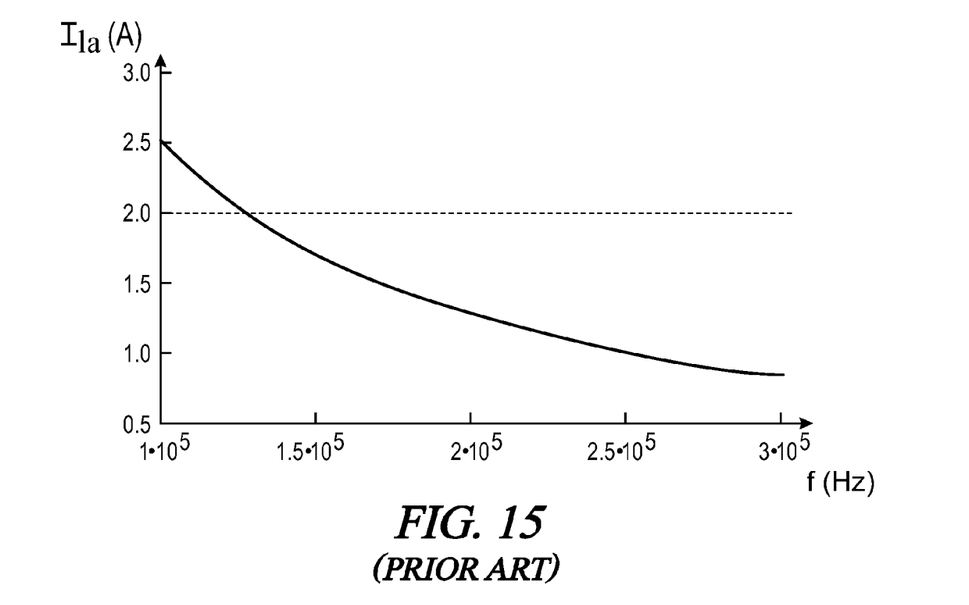
FIG. 15 is a graphical diagram showing a relationship between the amplitude and the operation frequency of the lamp current with respect to the ballast of FIG. 12.

Referring now to FIG. 14, it has been proposed to decrease the operation frequency f in a transitional phase. Because the operation frequency f is in a range where an amplitude |Ila| of the lamp current Ila decreases with respect to the operation frequency f (as shown in FIG. 15), the control circuit 2 decreases the lamp voltage Vla to increase the lamp current Ila in the filament heating period P2 by setting the operation frequency f to a first predetermined frequency (f1pred) which is lower than the operation frequency f upon termination of the startup period P1. In this manner, the amplitude of the lamp current Ila in the filament heating period P2 can be sufficiently increased, and the discharge in the discharge lamp La can be shifted from glow discharge to arc discharge and stabilized. Each of the filaments of the discharge lamp La is heated, and accordingly an asymmetric current condition which is caused by a temperature difference between the filaments of the discharge lamp La is also decreased after the filament heating period P2.

Referring again to FIG. 14, the control circuit 2 gradually increases the lamp voltage Vla during the startup period P1 by gradually decreasing the operation frequency f to approach a pre-ignition resonant frequency (fres). The operation frequency f is further decreased from the first predetermined frequency f1pred in the middle of the filament heating period P2 to a second predetermined frequency f2pred.

In a discharge lamp ballast so described, the discharge lamp La shifts from glow discharge to arc discharge during a filament heating operation and stabilizes after transition to a normal operation, in comparison to a case where the filament heating operation is not conducted, and preventing the ballast from suddenly becoming extinguished.

However, the impedance of a load circuit varies in accordance with characteristics of the circuit components and of the discharge lamp La, and further due to ambient temperature. Accordingly, when values for the operation frequency f in the filament heating operation are predetermined, lamp current may be too low in the filament heating operation and the light output from the discharge lamp La in the subsequent normal operation is therefore not stabilized, or conversely an excessive lamp current may flow and undesirable electric stresses may be applied to the circuit components and the discharge lamp La.

BRIEF SUMMARY OF THE INVENTION

In accordance with the present invention, a discharge lamp ballast is provided to optimize an output current to the discharge lamp during a filament heating operation. The ballast in various embodiments uses a feedback control loop to adjust the output current such that lamp operation is stabilized and excessive stresses on circuit components are substantially reduced, regardless of the characteristics or type of circuit components and discharge lamp used.

In a first embodiment, a discharge lamp ballast is provided for powering a discharge lamp with feedback filament heating control. A startup circuit is coupled between output terminals of a DC-AC power converter together with a discharge lamp. A lamp current detection circuit and a lamp voltage detection circuit detect output signals to the lamp. A control circuit controls the switching elements and generates an operating frequency in accordance with a startup operation to generate a high voltage output from the startup circuit and ignite the discharge lamp, a filament heating operation wherein the operating frequency is controlled so as to set the amplitude of the output current detected by the lamp current detection circuit to a target current amplitude based on the amplitude of the output voltage detected by the lamp voltage detection circuit, and a steady-state operation wherein the operating frequency is decreased to maintain a stable light output from the discharge lamp.

In another embodiment, a method is provided for feedback control of filament heating of a discharge lamp ballast having a DC-AC power converter with a plurality of switching elements, a resonant circuit and a discharge lamp coupled between output terminals of the power converter, a lamp current detector, and a lamp voltage detector. During a first control operation, the method includes the step of controlling the switching elements to turn on and off at operating frequencies that sweep through a predetermined range, wherein a high voltage output is generated by the resonant circuit for igniting the lamp. During a second control operation, the method includes the steps of detecting a lamp voltage amplitude, determining a target current amplitude based on the detected lamp voltage amplitude, detecting a lamp current amplitude, and adjusting the operating frequency of the switching elements to set the lamp current amplitude to the target current amplitude. During a third control operation, the method includes the step of reducing the operating frequency of the switching elements with respect to the second control operation, wherein the lamp maintains a stable light output.

In another embodiment of the present invention, an illumination fixture is provided which includes a discharge lamp ballast positioned within a fixed ballast housing and a discharge lamp positioned within a lamp housing. The lamp housing is coupled to the ballast housing, either in a fixed or pivoting manner. The discharge lamp ballast further includes a DC-AC power converter having a plurality of switching elements, a lamp current detection circuit, a lamp voltage detection circuit and a switch control circuit. The control circuit is configured after lamp ignition to provide feedback control during a filament heating operation wherein the amplitude of a detected lamp current is driven to a target current amplitude determined based on the amplitude of a detected lamp voltage.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" as used herein generally refer to an inverter circuit for DC-AC power conversion, but is not so inherently limited, and with respect to any particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Referring generally to FIGS. 1-11, various embodiments of a lamp ballast and methods of operation in accordance with the present invention will be explained below.

Figure 2:
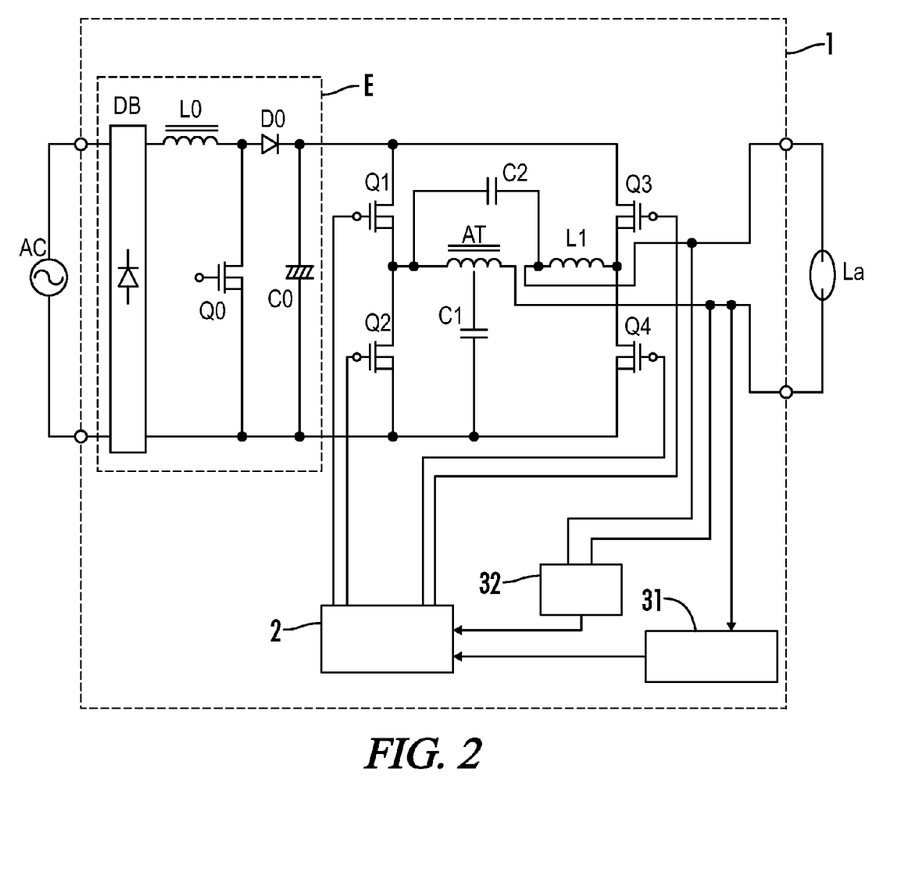
FIG. 2 is a circuit diagram showing an embodiment of a lamp ballast associated with the operational parameters of FIG. 1.

Various structural components for a discharge lamp ballast in an embodiment as shown in FIG. 2 are substantially the same as that of the discharge lamp ballast shown in FIG. 12 and previously described herein, and therefore illustrations and explanations of like components will be omitted as unnecessary.

Figure 1A:
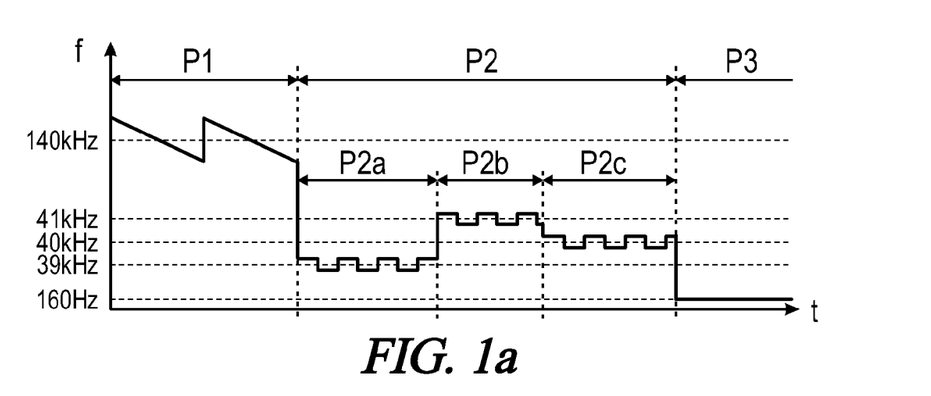
FIGS. 1a-1c are graphical diagrams showing changes in operation frequency, a voltage amplitude, and a current amplitude with respect to time in an embodiment of the present invention.
Figure 1B:
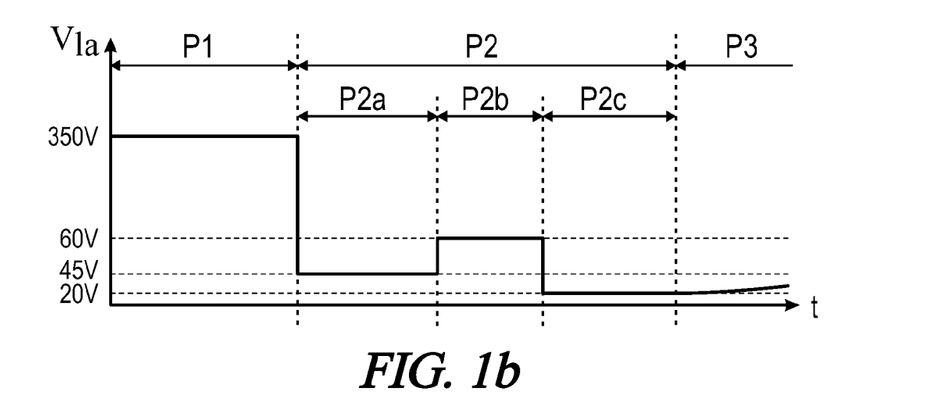
Figure 1C:
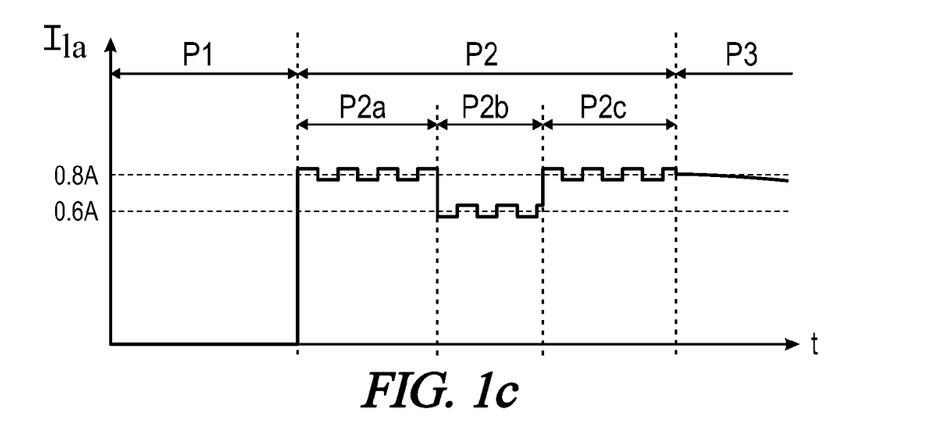

Referring now to FIGS. 1 and 2, the control circuit 2 throughout a startup period P1 repeatedly performs a startup operation in which an operation frequency f is reduced from an upper limit to a lower limit (or "swept") through a range of frequencies which includes 140 kHz that is approximately one-third of 430 kHz of a pre-ignition resonant frequency. The control circuit 2 may terminate the startup operation, as an example, when initiation of discharge is detected in the discharge lamp La by any of various techniques as known in the art. Alternatively, the control circuit 2 may terminate the startup operation when a predetermined time sufficient to start the discharge lamp La has passed after the beginning of the startup operation.

The ballast 1 includes a lamp current detection circuit 31 for detecting the amplitude of an output current from the power converter to the lamp or otherwise a current flowing through the lamp Ila (hereinafter referred to as "a current amplitude") |Ila| and a lamp voltage detection circuit 32 for detecting an amplitude of an output voltage from the power converter to the lamp or otherwise a voltage across the lamp |Vla| (hereinafter referred to as "a voltage amplitude") |Vla|.

The control circuit 2 conducts feedback control of the operation frequency f so as to drive the current amplitude |Ila| detected by the lamp current detection circuit 31 towards a target current amplitude $I_t$ which is determined based on the voltage amplitude |Vla| detected by the lamp voltage detection circuit 32 during the filament heating period P2.

Figure 3:
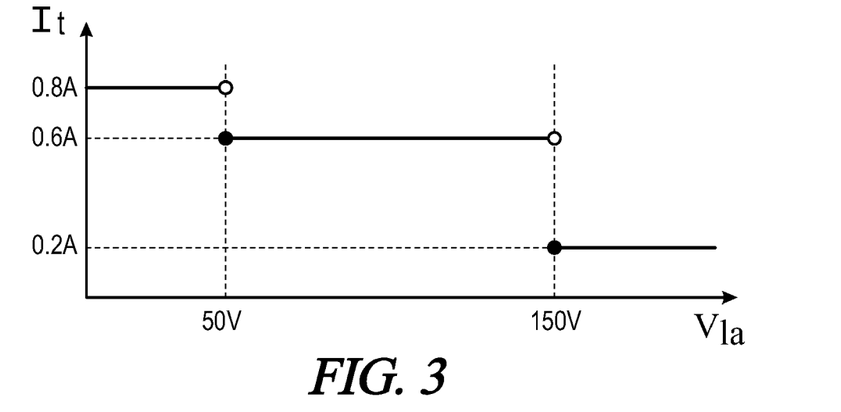
FIG. 3 is a graphical diagram showing an embodiment of a method for determining a target current amplitude based on the voltage amplitude of FIG. 1.

In an embodiment as shown for example in FIG. 3, the target current amplitude $I_t$ may be stepped up or down based on the voltage amplitude |Vla|. When the voltage amplitude |Vla| is less than 50V, the target current amplitude $I_t$ is 0.8 A, when the voltage amplitude |Vla| is 50V or more and is less than 150V, the target current amplitude $I_t$ is 0.6 A, and when the voltage amplitude |Vla| is 150V or more, the target current amplitude $I_t$ is 0.2 A.

In an embodiment where a rated voltage of the discharge lamp La is 90V, it may be true that when the voltage amplitude |Vla| is 150V or more, the discharge in the discharge lamp La is glow discharge, and when the voltage amplitude |Vla| is less than 150V, the discharge in the discharge lamp La is an arc discharge. Accordingly, the control circuit 2 may determine on the basis of the voltage amplitude |Vla| whether the discharge in the discharge lamp La is glow discharge or arc discharge, and therefore determines the target current amplitude $I_t$ on the basis of the discharge determination result.

Figure 4A:
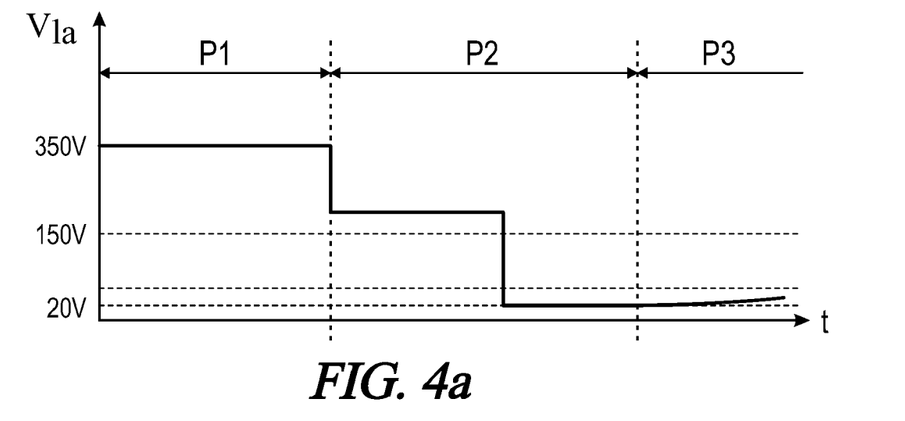
FIGS. 4a and 4b are graphical diagrams showing changes in the voltage amplitude and the current amplitude with respect to time in an embodiment of the present invention.
Figure 4B:
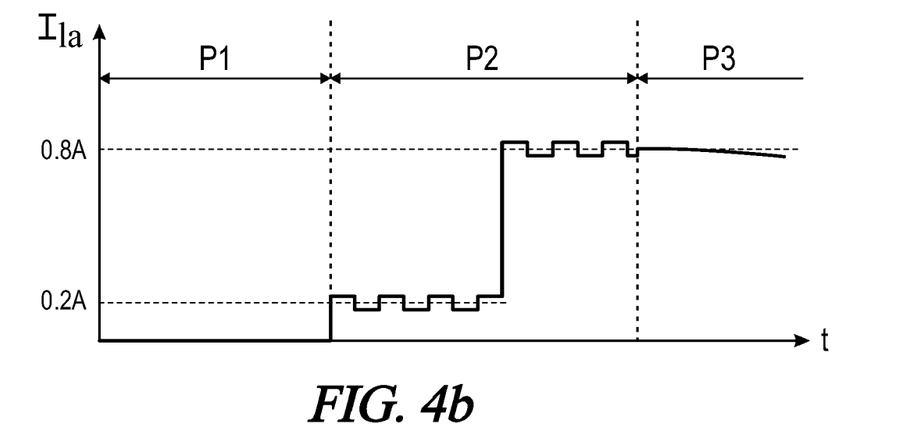

In the example of FIG. 1, the voltage amplitude |Vla| is not 150V or more during the filament heating period P2. However, in the case where the voltage amplitude |Vla| becomes 150V or more during the filament heating period P2 as shown in FIG. 4, the target current amplitude $I_t$ is 0.2 A.

Figure 5:
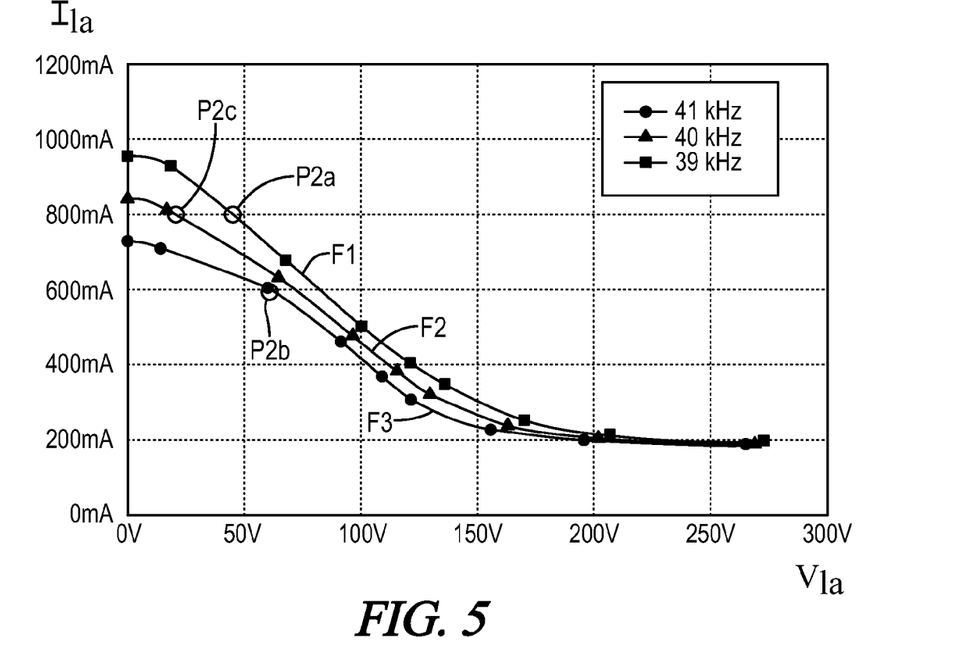
FIG. 5 is a graphical diagram showing a relationship between the voltage amplitude and the current amplitude in accordance with varying operational frequencies in an embodiment of the present invention.

Referring to FIG. 5, for three cases where the operation frequency f is 39 kHz, 40 kHz, and 41 kHz, such as in the period P2 in FIG. 1, a relationship between the voltage amplitude |Vla| and the current amplitude |Ila| may be described. The curved line F1 represents a relationship where the operation frequency f is 39 kHz, curved line F2 represents a relationship where the operation frequency f is 40 kHz, and curved line F3 represents a relationship where the operation frequency f is 41 kHz. As overall impedance decreases as the operation frequency f is reduced, the current amplitude |Ila| becomes larger. That is, the control circuit 2 increases the operation frequency f when the current amplitude |Ila| is large with respect to the target current amplitude $I_t$, and decreases the operation frequency f when the current amplitude |Ila| is small with respect to the target current amplitude $I_t$, thereby moving the current amplitude |Ila| closer to the target current amplitude $I_t$. In FIG. 5, target values for three sub-periods P2a, P2b, and P2c in the filament heating period P2 in FIG. 1 are shown, respectively.

The target current amplitude $I_t$ is not limited in any way to the above-mentioned three values, and may be two values or may be four or more.

Figure 6:
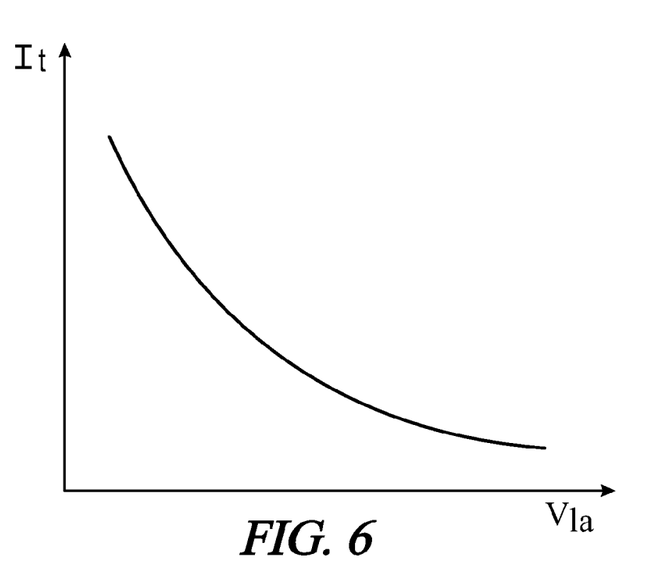
FIG. 6 is a graphical diagram showing another embodiment of a method for determining the target current amplitude based on the voltage amplitude of FIG. 1.

In various embodiments, adjustments to the target current amplitude $I_t$ based on the voltage amplitude |Vla| may be continuous instead of the above-described stepwise fashion. For example, as shown in FIG. 6, a value obtained by dividing a predetermined target power by the voltage amplitude |Vla| is employed as the target current amplitude $I_t$, and thus the target current amplitude It is kept in inverse proportion to the voltage amplitude |Vla|. That is, the output power to the discharge lamp La is substantially constant regardless of the voltage amplitude |Vla|. To minimize power consumption, the predetermined target power may be set as small as is possible while still maintaining the discharge in the discharge lamp La.

Figure 7:
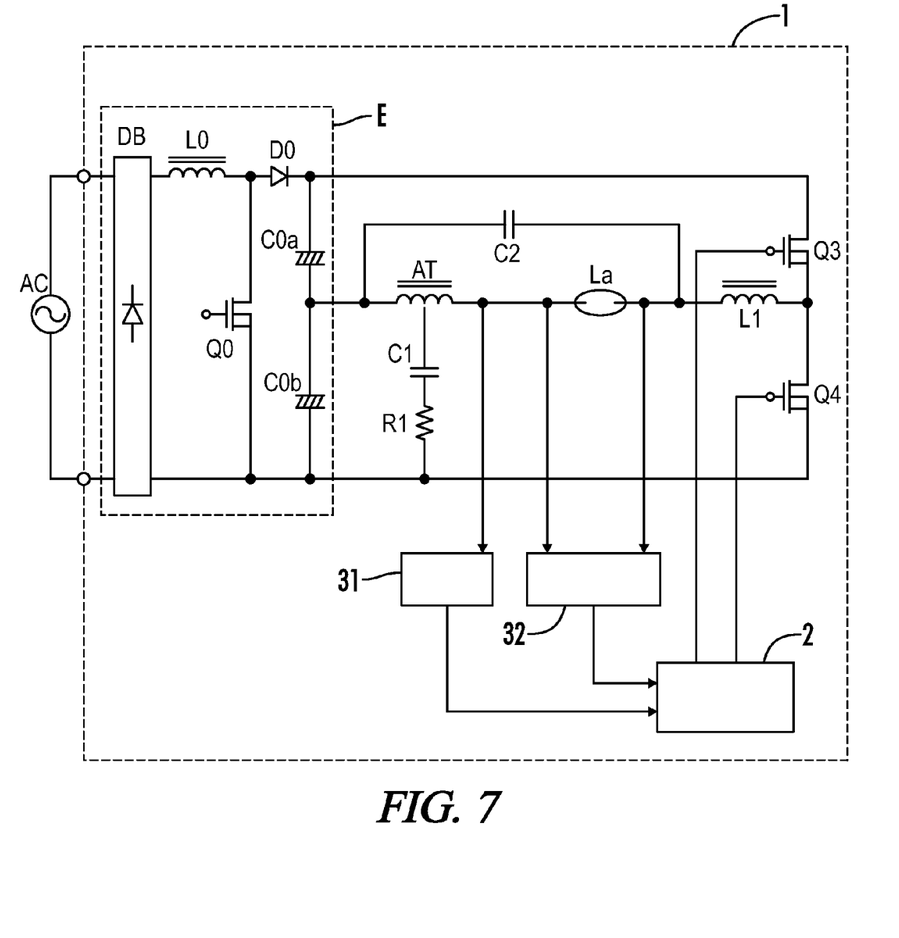
FIG. 7 is a circuit diagram showing another embodiment of the ballast of the present invention.

Referring now to FIG. 7, in another embodiment of a ballast configuration, a half-bridge circuit is provided with switching elements Q1 and Q2 as shown in FIG. 2 being replaced by a series circuit of capacitors C0a and C0b. The capacitors C0a and C0b serve as an output capacitor C0 for the step-up chopper circuit of the DC power source E. A resistor R1 is further added between a first capacitor C1 and ground. During the normal period P3, PWM control may be provided to adjust output power to the discharge lamp La by controlling a duty ratio of the switching elements Q3 and Q4.

Figure 8:
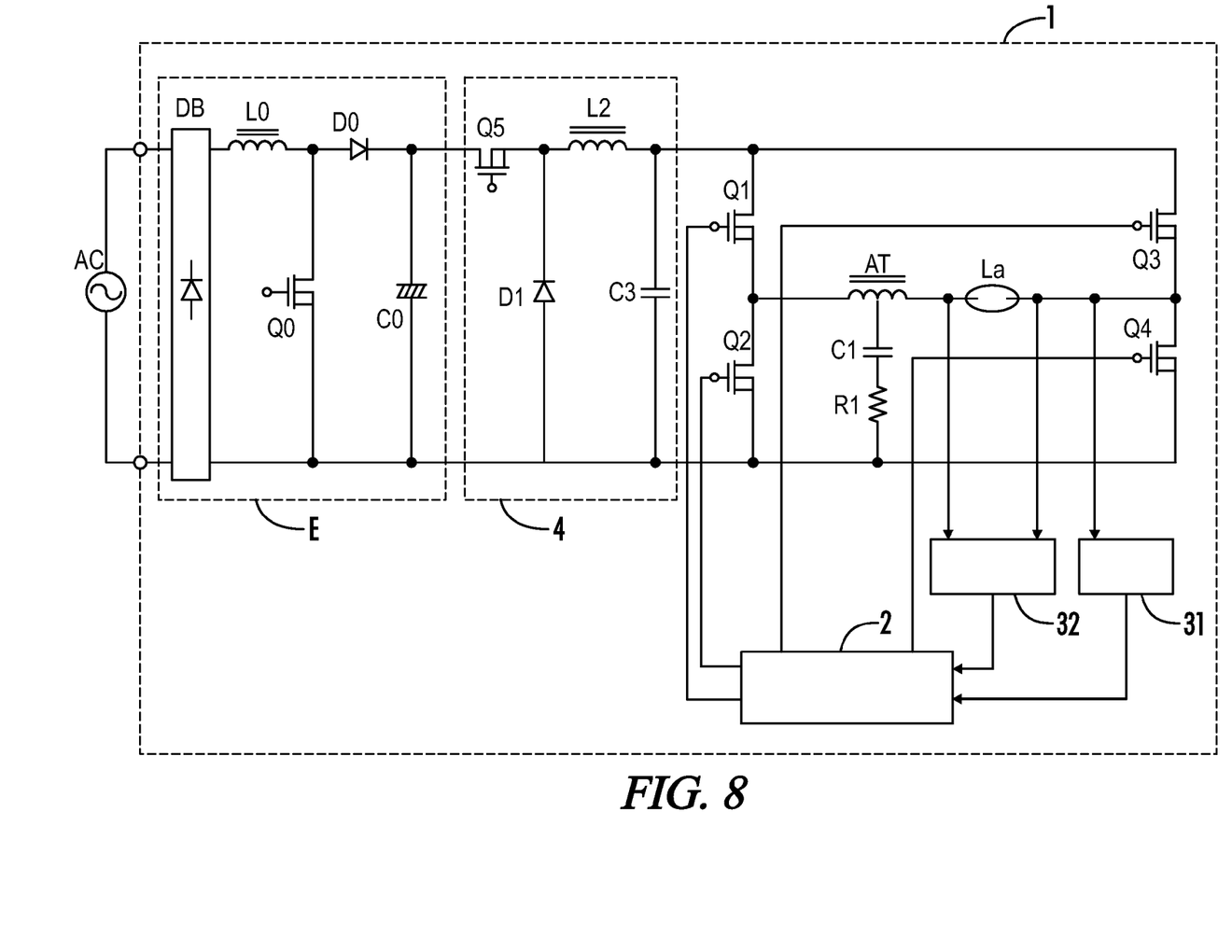
FIG. 8 is a circuit diagram showing another embodiment of the ballast of the present invention.

Alternatively, in an embodiment as shown in FIG. 8, a step-down chopper circuit 4 may be provided for stepping down the output voltage of the DC power source E and outputting the voltage to the full-bridge circuit including the four switching elements Q1 to Q4. In the embodiment shown, a switching element Q5 in the step-down chopper circuit 4 has one end coupled to an output terminal on a high voltage side of the DC power source E and another end coupled to an input terminal of the full bridge circuit via an inductor L2. A diode D1 has a cathode coupled to a node between the switching element Q5 and the inductor L2, and an anode coupled to ground. A capacitor C3 is coupled in parallel with the full-bridge circuit and the step-down chopper circuit 4.

Additionally, in an embodiment as shown in FIG. 8 and in contrast with an embodiment as shown in FIG. 2 for example, the inductor L1 and the second capacitor C2 are omitted from the load circuit. Therefore, in the startup operation, the starting high voltage may be provided to the discharge lamp La based on resonance characteristics of a resonant circuit including a first capacitor C1 and an auto-transformer AT. Because the control circuit 2 can control power supplied to the discharge lamp La based on a duty ratio of the switching element Q5 of the step-down chopper circuit 4, the previously described PWM control which is based on the duty ratios of the switching elements Q1 to Q4 of the full bridge circuit is unnecessary even during the normal period P3.

In addition, the feedback control carried out by the control circuit 2 may be conducted by changing the output voltages of the DC power source E and the step-down chopper circuit 4 rather than changing the operation frequency f as described above with regards to previous embodiments.

Because each of the previously described embodiments of the control circuit 2, the lamp current detection circuit 31, and the lamp voltage detection circuit 32 can be structurally realized by various electronic circuit configurations as are well known in the art, detailed drawings and explanations may be omitted.

Figure 9:
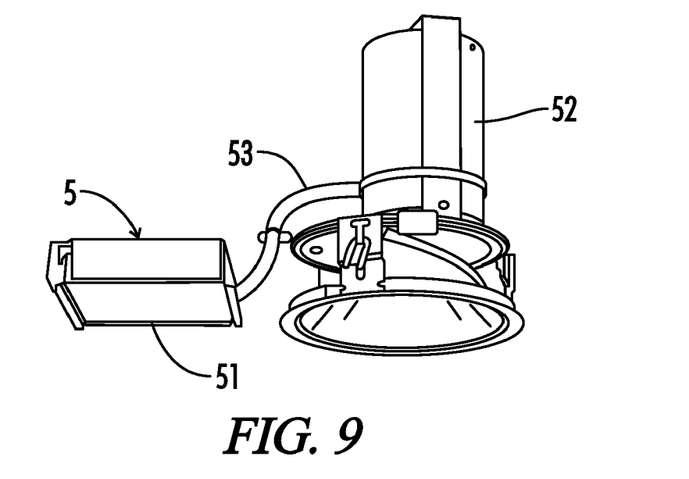
FIG. 9 is a perspective view showing one example of an illumination fixture using a ballast in accordance with the present invention.
Figure 10:
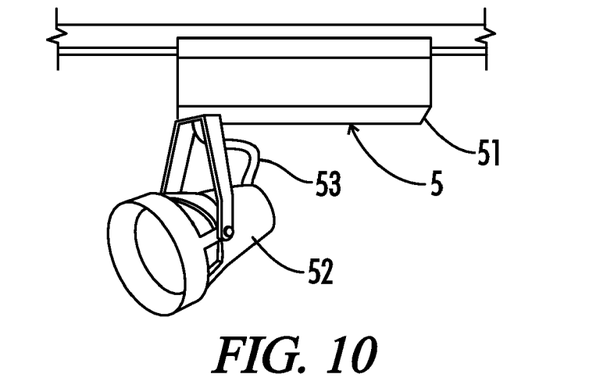
FIG. 10 is a perspective view showing another example of an illumination fixture using a ballast in accordance with the present invention.
Figure 11:
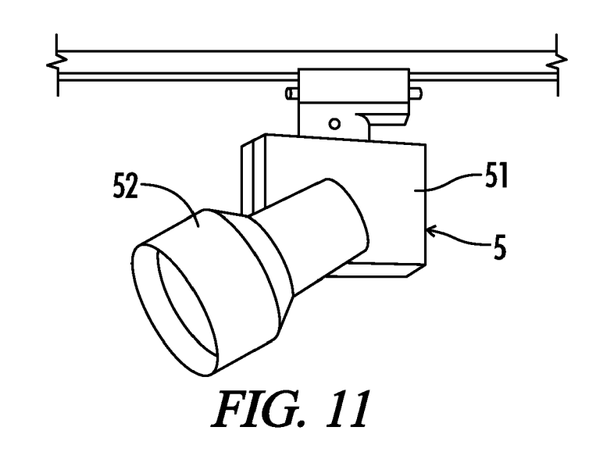
FIG. 11 is a perspective view showing another example of an illumination fixture using a ballast in accordance with the present invention.

Various embodiments of the discharge lamp ballast 1 may be used with an illumination fixture 5, for example as shown in FIGS. 9, 10, and 11. The illumination fixture 5 shown in FIGS. 9-11 include a ballast housing 51 for the discharge lamp ballast 1 and a lamp housing 52 for the discharge lamp La. In addition, the illumination fixture 5 of FIG. 9 and the illumination fixture 5 of FIG. 10 include a power supply line 53 electrically connecting the discharge lamp ballast 1 to the discharge lamp La. The illumination fixture 5 of FIG. 9 is a downlight whose ballast housing 51 and lamp housing 52 are both fixed to a ceiling surface, and the illumination fixture 5 of FIG. 10 and the illumination fixture 5 of FIG. 11 are spotlights whose lamp housing 52 is pivotally attached with respect to the ballast housing 51 which is fixed to an attachment surface such as the ceiling surface. Since the above-mentioned types of illumination fixtures 5 themselves may be realized by various techniques as known in the art, detailed explanations are omitted.

Thus, although there have been described particular embodiments of the present invention of a new and useful Electronic Ballast with Feedback Current Control for Preheating of Discharge Lamp Filaments, it is not intended that such references be construed as limitations upon the scope of this invention except as set forth in the following claims.

What is claimed is:
1. A discharge lamp ballast comprising:
   a DC-AC power converter having a plurality of switching elements;
   a startup circuit functional to generate a high voltage to ignite a discharge lamp, the startup circuit coupled between output terminals of the power converter;
   a lamp current detection circuit functional to detect an amplitude of a lamp output current;

a lamp voltage detection circuit functional to detect an amplitude of a lamp output voltage; and a control circuit effective to control the switching elements and to generate an operating frequency in accordance with
- a startup operation to generate a high voltage output from the startup circuit,
- a filament heating operation wherein the operating frequency is controlled so as to adjust the amplitude of the lamp output current detected by the lamp current detection circuit to a target current amplitude, said target current amplitude determined based on the amplitude of the lamp output voltage detected by the lamp voltage detection circuit, and
- a steady-state operation wherein the operating frequency is decreased to maintain a stable light output.

2. The discharge lamp ballast of claim 1, wherein
the power converter further comprises a step-down chopper circuit coupled to a DC power source and four switching elements arranged in a full bridge circuit configuration.

3. The discharge lamp ballast of claim 1, wherein
the power converter further comprises four switching elements arranged in a full bridge circuit configuration, and
in the steady-state operation the control circuit controls an output power of the power converter by adjusting a duty ratio for one or more of the switching elements.

4. The discharge lamp ballast of claim 1, wherein
the power converter further comprises two switching elements arranged in a half bridge circuit configuration, and
in the steady-state operation the control circuit controls an output power of the power converter by adjusting a duty ratio for the switching elements.

5. The discharge lamp ballast of claim 1, wherein the filament heating operation comprises one or more sub-periods associated with changes in a measured lamp voltage, and
wherein upon each change in measured lamp voltage, the target current amplitude is adjusted in a stepped fashion based on the measured lamp voltage.

6. The discharge lamp ballast of claim 5, wherein each target current amplitude value is associated with a predetermined range of measured lamp voltage amplitude.

7. The discharge lamp ballast of claim 5, wherein each target current amplitude value is adjusted in a continuous relationship with a measured output voltage amplitude.

8. The discharge lamp ballast of claim 7, wherein
the target current amplitude comprises a value obtained by dividing predetermined target power by the measured output voltage amplitude.

9. The discharge lamp ballast of claim 8, wherein
the predetermined target power is set to a value sufficient to maintain lamp discharge.

10. The discharge lamp ballast of claim 1, wherein
the control circuit is functional to determine, based on the measured output voltage amplitude, whether discharge in the discharge lamp is a glow discharge or an arc discharge, and to set the target current amplitude based on the discharge determination.

11. A method of feedback control for a discharge lamp ballast, the ballast having a DC-AC power converter with a plurality of switching elements, a resonant circuit coupled between lamp output terminals of the power converter, a lamp current detector, and a lamp voltage detector, the method comprising:
during a first control operation, controlling the switching elements to turn on and off at operating frequencies that sweep through a predetermined range, wherein a high voltage output is generated by the resonant circuit for igniting a lamp;
during a second control operation,
detecting a lamp voltage amplitude,
determining a target current amplitude based on the detected lamp voltage amplitude,
detecting a lamp current amplitude, and
adjusting an operating frequency of the switching elements to set the lamp current amplitude to the target current amplitude; and
during a third control operation, reducing the operating frequency of the switching elements with respect to the second control operation to maintain a stable light output.

12. The method of claim 11, further comprising the steps of detecting lamp ignition and terminating the first control operation upon detecting lamp ignition.

13. The method of claim 11, further comprising the step of terminating the first control operation after a predetermined duration from the start of the first control operation.

14. The method of claim 11, further comprising repeating the steps in the second control operation to detect changes in the lamp voltage amplitude.

15. The method of claim 14, wherein the step of determining a target current amplitude based on the detected lamp voltage amplitude further comprises
setting a target current amplitude to a value associated with a predetermined lamp voltage amplitude range including the detected lamp voltage amplitude.

16. The method of claim 14, wherein the step of determining a target current amplitude based on the detected lamp voltage amplitude further comprises
determining a target current amplitude by dividing a predetermined target power value by the detected lamp voltage amplitude.

17. An illumination fixture comprising:
a discharge lamp ballast positioned within a fixed ballast housing; and
a discharge lamp positioned within a lamp housing, the lamp housing coupled to the ballast housing,
the discharge lamp ballast further comprising
a DC-AC power converter having a plurality of switching elements;
a lamp current detection circuit;
a lamp voltage detection circuit; and
a control circuit effective to control the switching elements and generate an operating frequency, the control circuit configured after lamp ignition and in accordance with a filament heating operation to provide feedback control to the switching elements to generate the operating frequency, wherein the amplitude of the detected lamp current is adjusted to a target current amplitude determined based on the amplitude of the detected lamp voltage.

18. The illumination fixture of claim 17, the target current amplitude associated with a predetermined lamp voltage amplitude range including the detected lamp voltage amplitude.

19. The illumination fixture of claim 17, the target current amplitude determined by dividing a predetermined target power value by the detected lamp voltage amplitude.

20. The illumination fixture of claim 17, wherein the lamp housing is pivotally coupled to the fixed ballast housing.

* * * * *